Figure 5:
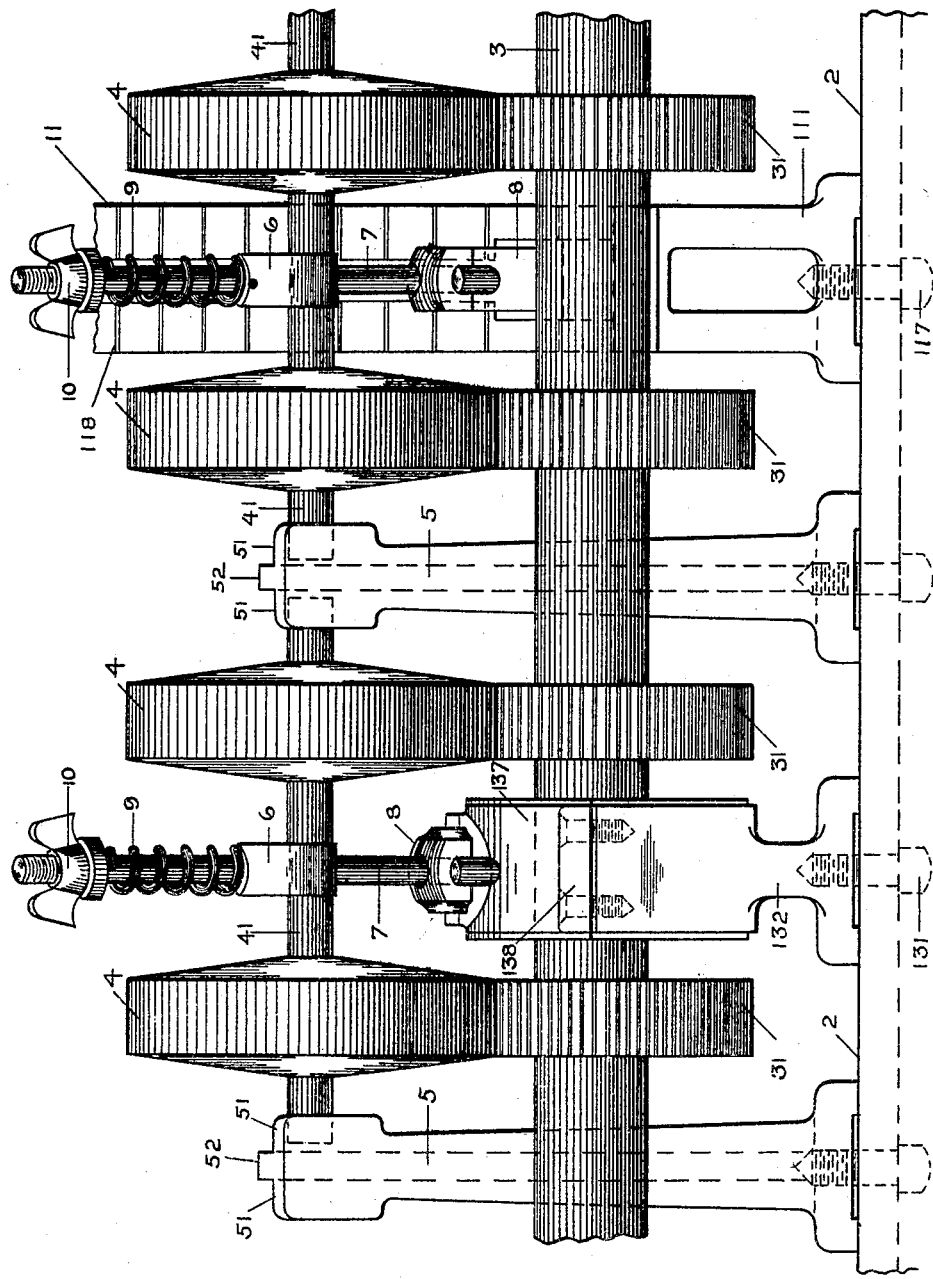

No. 765,715. PATENTED JULY 26, 1904.
F. P. SHAW.
MACHINE FOR PREPARING AND SPINNING WORSTED.
APPLICATION FILED APR. 5, 1904.
NO MODEL. 8 SHEETS—SHEET 1.
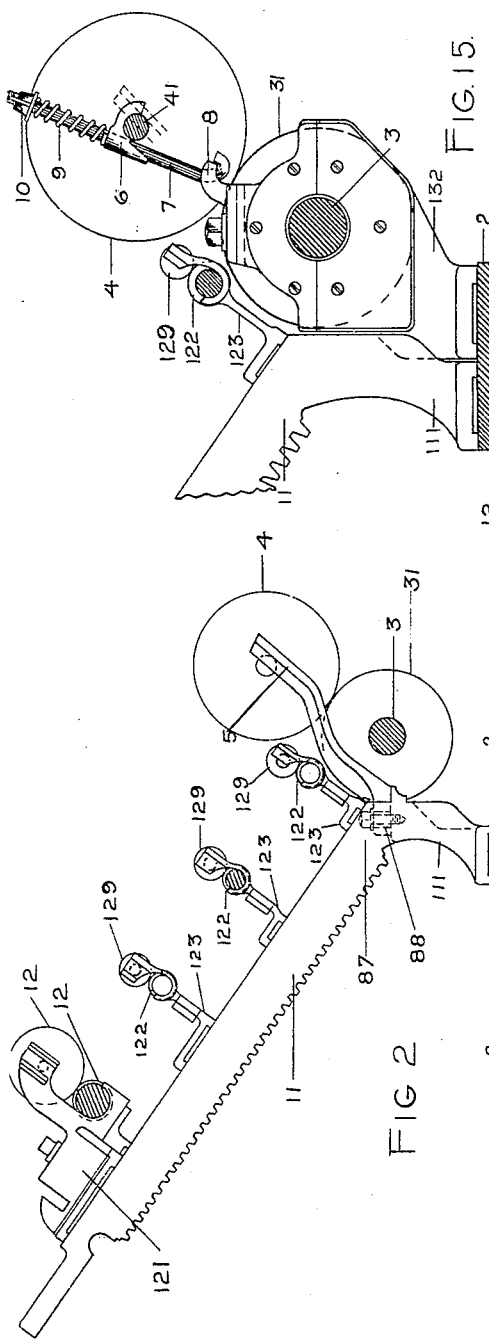
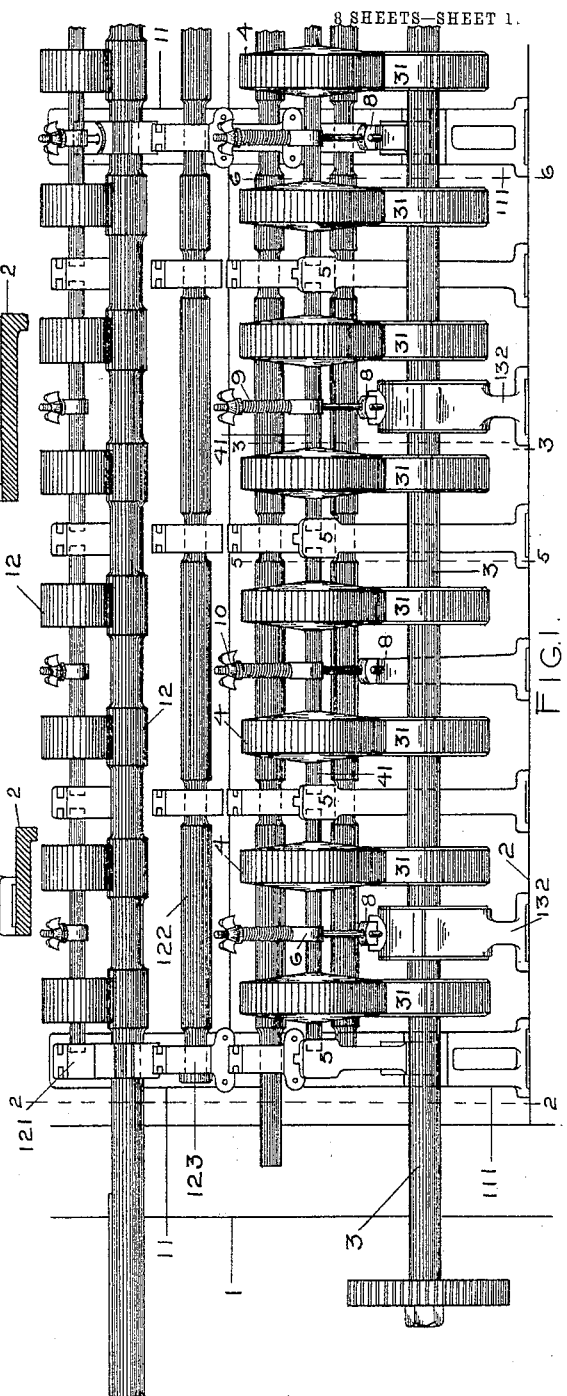
WITNESSES.
C. E. Spaulding
Channing Whitaker.
INVENTOR
Fred P. Shaw.

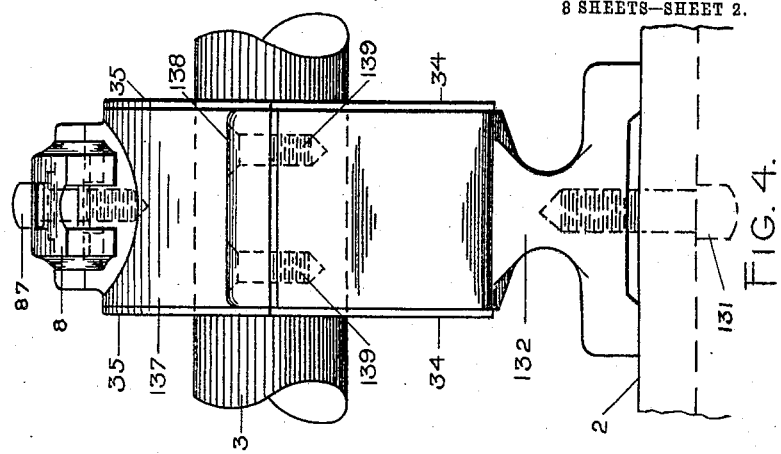
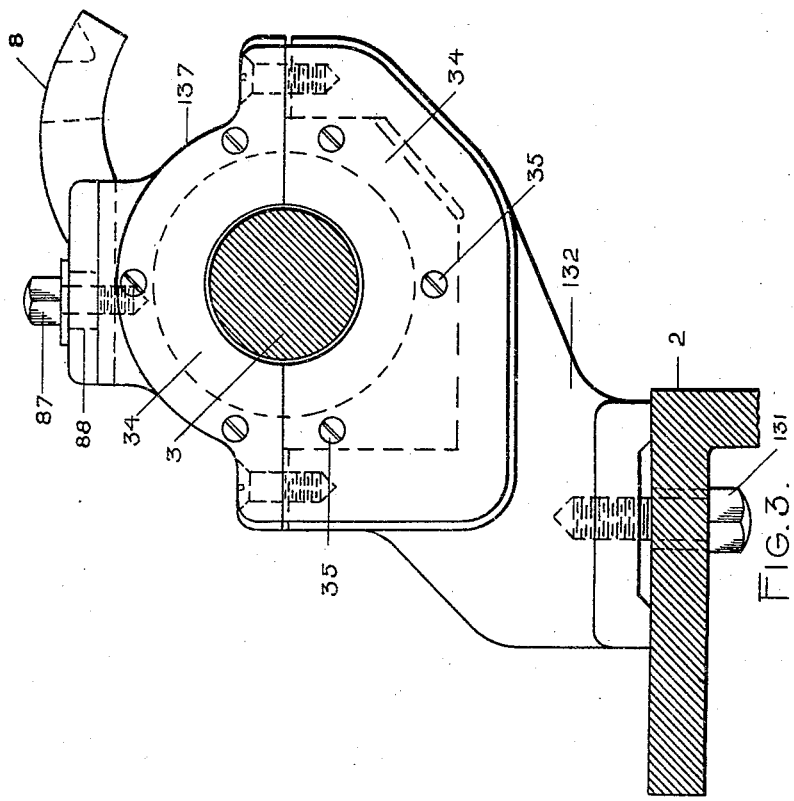

No. 765,715. PATENTED JULY 26, 1904.
F. P. SHAW.
MACHINE FOR PREPARING AND SPINNING WORSTED.
APPLICATION FILED APR. 5, 1904.
NO MODEL. 8 SHEETS—SHEET 4.
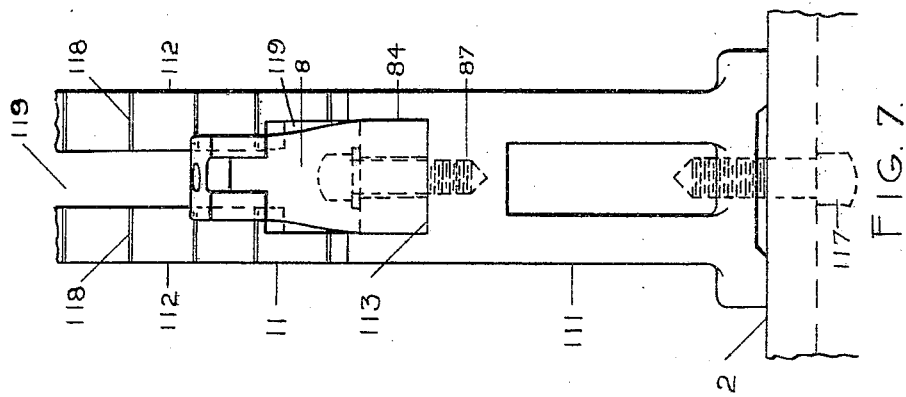
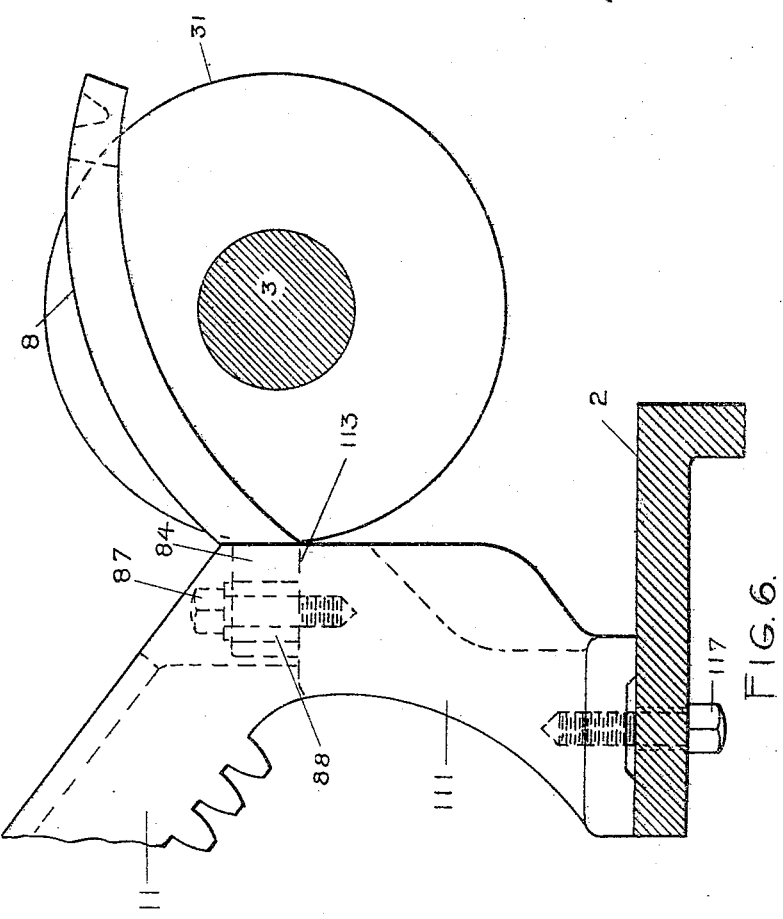
WITNESSES.
C. E. Spaulding
Channing Whitaker
INVENTOR.
Fred P. Shaw.

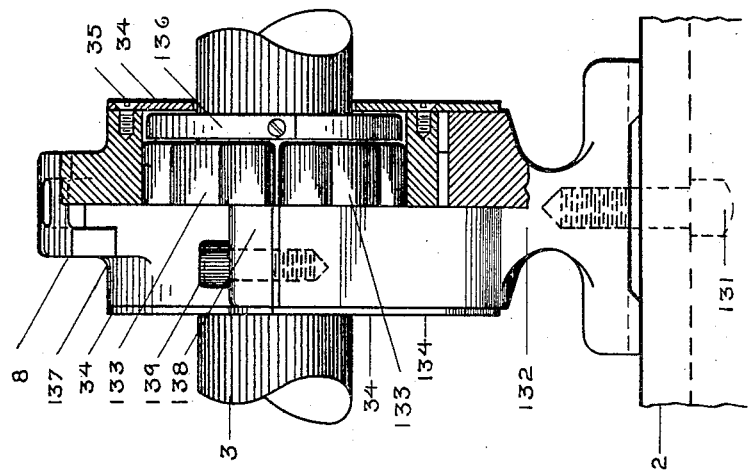
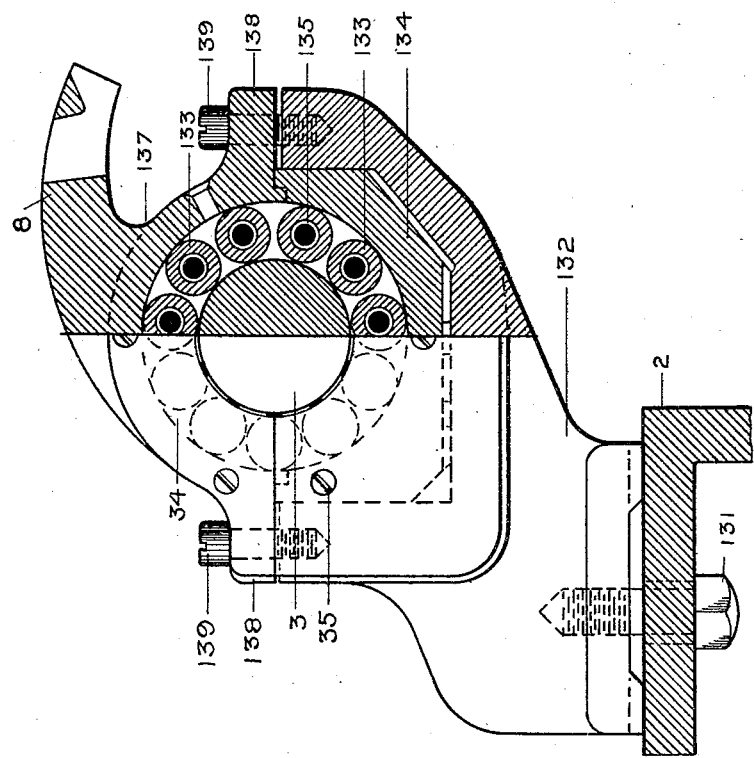

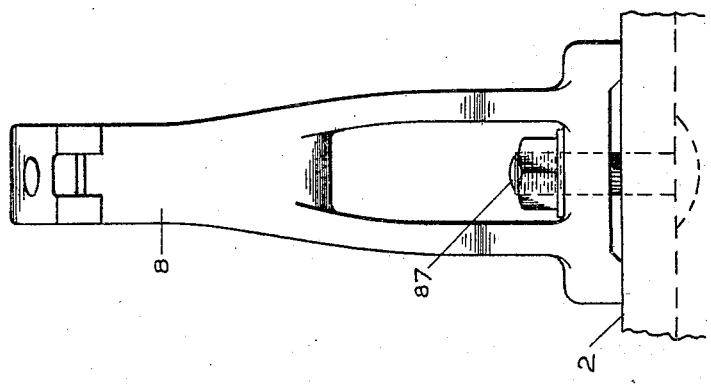
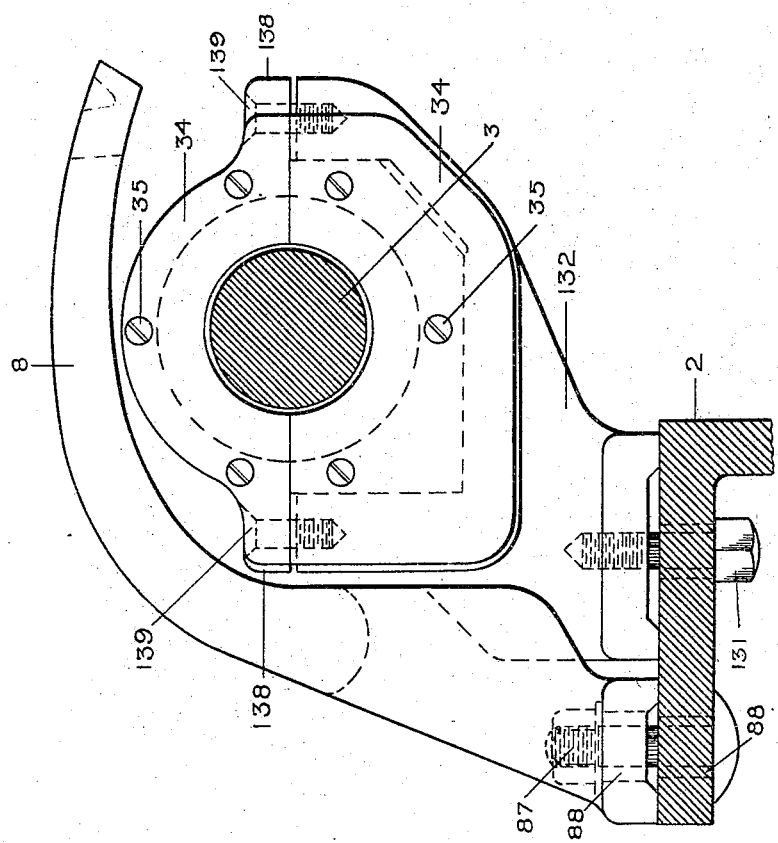

No. 765,715. PATENTED JULY 26, 1904.
F. P. SHAW.
MACHINE FOR PREPARING AND SPINNING WORSTED.
APPLICATION FILED APR. 5, 1904.
NO MODEL. 8 SHEETS—SHEET 7.
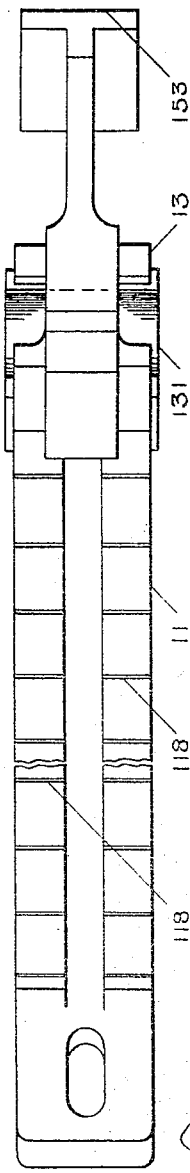
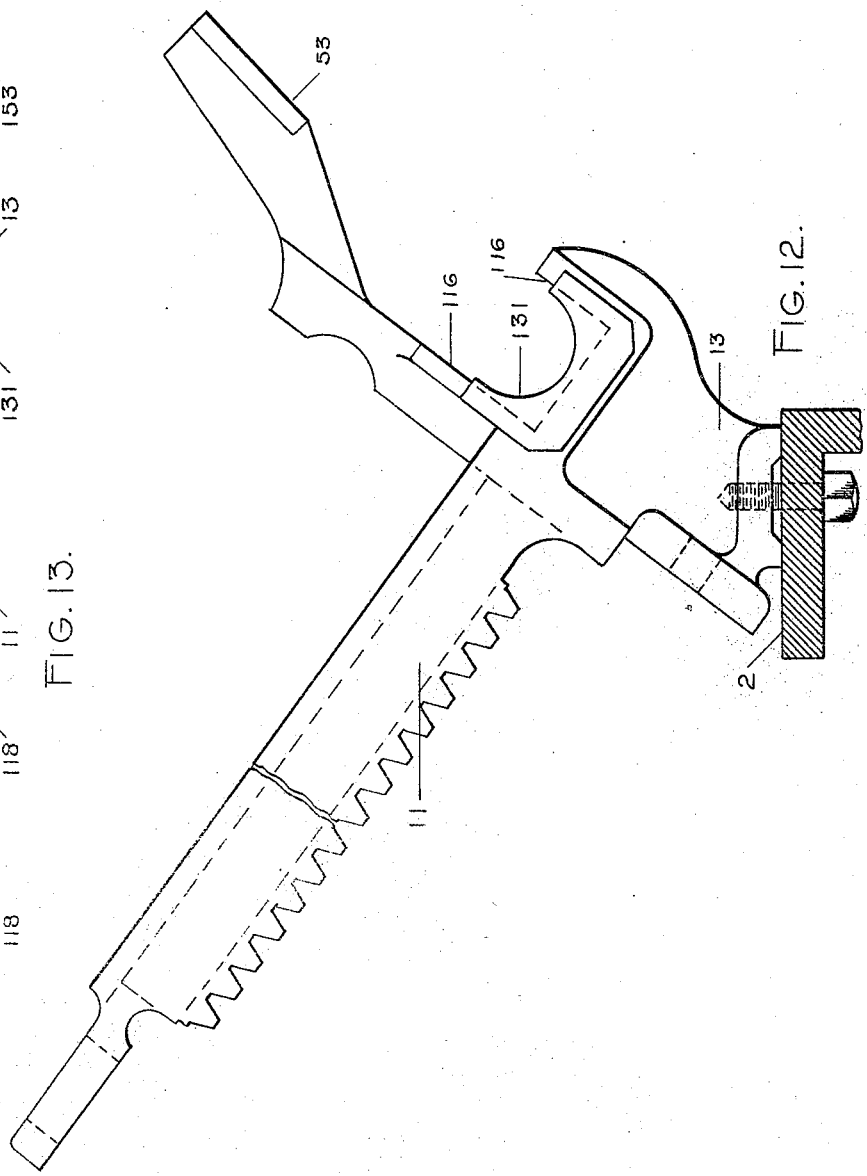
WITNESSES
C. E. Spaulding
Channing Whitaker
INVENTOR
Fred P. Shaw

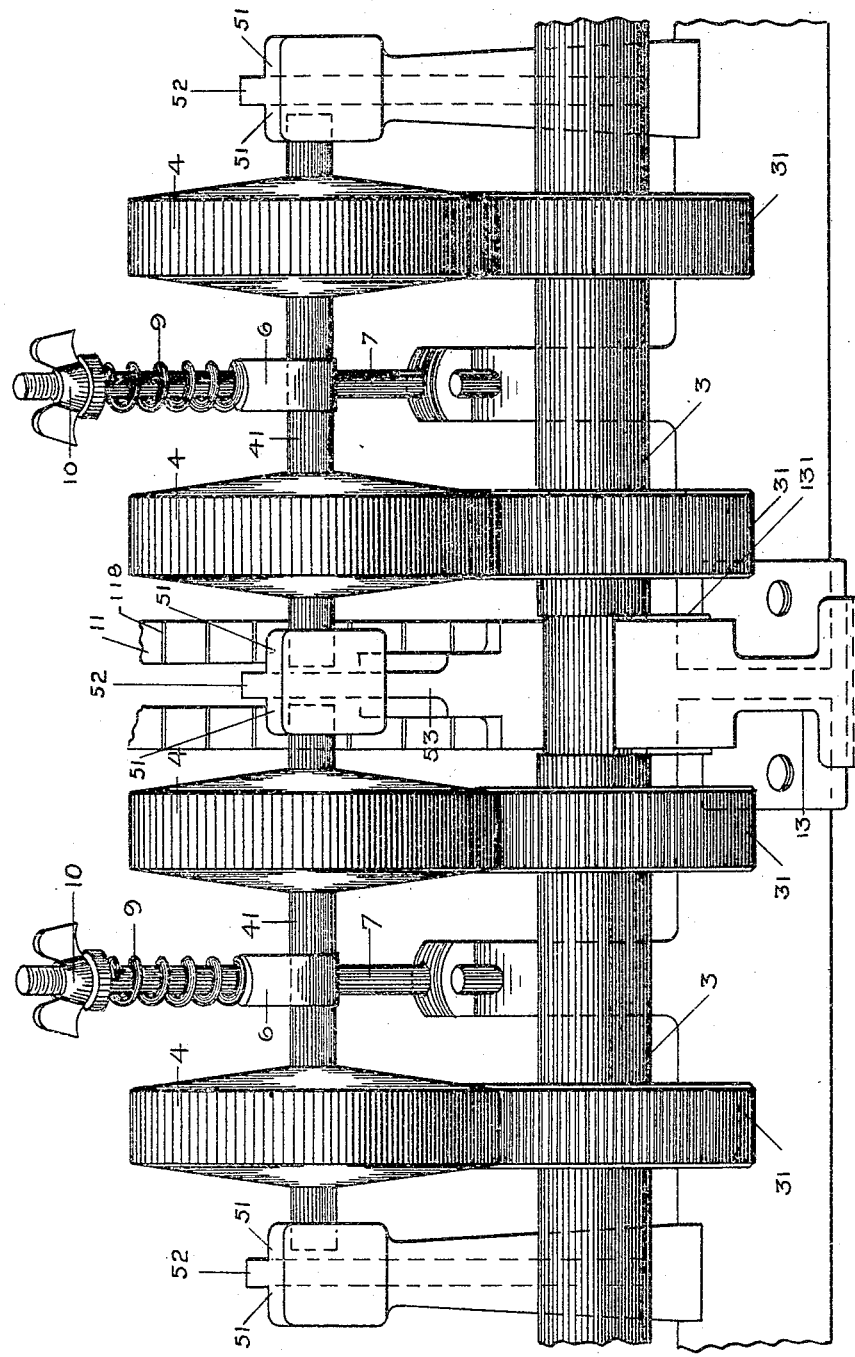

No. 765,715.

Patented July 26, 1904.

UNITED STATES PATENT OFFICE.

FREDERICK PIERPONT SHAW, OF LOWELL, MASSACHUSETTS, ASSIGNOR TO LOWELL MACHINE SHOP, OF LOWELL, MASSACHUSETTS, A CORPORATION OF MASSACHUSETTS.

MACHINE FOR PREPARING AND SPINNING WORSTED.

SPECIFICATION forming part of Letters Patent No. 765,715, dated July 26, 1904.

Application filed April 5, 1904. Serial No. 201,736. (No model.)

*To all whom it may concern:*

Be it known that I, FREDERICK PIERPONT SHAW, residing at Lowell, in the county of Middlesex and State of Massachusetts, have invented certain new and useful Improvements in Machines for Preparing and Spinning Worsted, of which the following description, with the accompanying drawings, is a specification, like numerals on the drawings denoting like parts.

The invention has relation to drawing mechanism of the type that is employed in machines for preparing and spinning worsted and the like.

In particular the invention relates to the roll-stands (usually termed "carriage-stands" in the art) of mechanism of such type, to the means of supporting the lower front drawing-roll of such mechanism, and to the provisions for the application of tension or pressure to the front top rolls.

The invention consists in the improvements which I will describe with reference to the accompanying drawings, in which latter I have illustrated embodiments of the said improvements in connection with a drawing mechanism which in general respects is of the character heretofore in use in worsted-spinning frames.

In the drawings, Figure 1, Sheet 1, shows in front elevation a portion of the length of the said mechanism with the invention applied thereto. Fig. 2, Sheet 1, is a view, mainly in end elevation, showing the parts which are located at the right-hand side of the dotted line 2 2, Fig. 1. Fig. 3, Sheet 2, is a view, on a somewhat enlarged scale, showing the intermediate bearing of Fig. 1 in side elevation and the roller-beam and shaft of the lower front drawing-roll in vertical section on the plane indicated by the dotted line 3 3 in Fig. 1. Fig. 4 shows in front elevation the parts which are represented in Fig. 3. Fig. 5, Sheet 3, is a view in front elevation, also on an enlarged scale, showing the parts which are located at the right-hand side of line 5 5, Fig. 1. Fig. 6, Sheet 4, is a view in vertical section on the plane indicated by the dotted line 6 6, Fig. 1, showing chiefly the front end of an intermediate roll-stand with the hook which is applied thereto. Fig. 7, Sheet 4, shows the parts of Fig. 6 in front elevation, omitting the lower front drawing-roll. Figs. 8 and 9, Sheet 5, show, in partly-sectional side elevation and partly-sectional front elevation, respectively, a bearing having a cover provided with a hook integral therewith. Fig. 10, Sheet 6, shows in vertical section portions of the roller-beam and shaft of the lower front drawing-roll, a bearing mounted thereon for the lower front drawing-roll, and a hook mounted on the roller-beam in the same space with the said bearing between drawing-bosses. Fig. 11, Sheet 6, shows the hook of Fig. 8 in front elevation. Figs. 12 and 13, Sheet 7, show in side elevation and in plan, respectively, a roll-stand of usual construction with bearing-stand and horn integral therewith. Fig. 14, Sheet 8, shows in front elevation portion of a drawing mechanism of ordinary construction, including the roll-stand, &c., of Figs. 12 and 13 and adjoining parts. Fig. 15, Sheet 1, shows, mainly in side elevation, a construction containing a separate bearing-stand, which is mounted upon the roller-beam in line with the roll-stand and provided with a cover having a hook connected therewith.

Having reference to the drawings, 1, Fig. 1, is one of the machine end frames, and 2, Figs. 1, 2, 3, &c., is a beam which extends longitudinally of the machine at the front of the latter and is attached to the fixed framework of the machine. The said beam is referred to hereinafter as the "roller-beam." Roll-stands (usually termed "carriage-stands" in the art) are shown at 11 11. A number of these are employed in the length of the machine. Their front ends are provided with feet 111 111, Fig. 2, Sheet 1, Fig. 5, Sheet 3, and Figs. 6 and 7, Sheet 4, which rest upon and are secured to the roller-beam. Their rear ends are supported by portions of the framework which are not shown in the drawings. The rear drawing-rolls are represented at 12 12, Figs. 1 and 2. At 121, Figs. 1 and 2, is shown one of the stands for the said rear drawing-rolls. The said stand 121 is mounted upon the roll-stand at the end of the machine, being applied to the slideway or guideway with which the said roll-stand is provided, and is adjustable in well-known manner along the said slideway or guideway in the direction from front to rear in the machine to increase or diminish the distance separating the said rear drawing-rolls from the front drawing-rolls.

At 122 122, &c., are shown the usual carrier-rolls, which are located intermediate the rear drawing-rolls and the front drawing-rolls, and at 123 123, &c., are shown the carrier-stands, the said carrier-stands being mounted upon the roll-stands and adjustable along the slideways or guideways of the latter in usual manner in the direction from front to rear in the machine. The usual wooden presser-rolls which are applied in practice to the carrier-rolls for the purpose of holding the slivers or rovings pressed lightly against the latter are omitted from Fig. 1, but are shown in Fig. 2 at 129 129. The ends of the said presser-rolls are applied to guides with which the carrier-stands are furnished. The shaft of the lower front drawing-roll is shown at 3, and the drawing-bosses of the said drawing-roll are represented at 31 31, &c. The bearings which are provided at intervals in the length of the machine for the support of the said lower front drawing-roll will presently be referred to. The front top rolls which coöperate with the bosses 31 31, &c., consist, as usual, of bosses 4 4, which are attached in pairs to short shafts 41 41, &c., the ends of each such short shaft projecting at the opposite sides of the pair of bosses thereon to constitute journals. The fixed "horns," so called, rising adjacent the bosses 31 31, &c., and constituting guides for the said journals whereby the working positions of the front top rolls with respect to the lower front drawing-rolls are determined are marked 5 5, &c., in Figs. 1, 2, and 5. The manner in which the said horns are applied and supported will presently be explained. Each thereof is furnished, as usual, with one or more laterally-projecting wings 51 51, against the rear faces of which the journals of the front top rolls rest, and each horn has a longitudinally-extending rib 52. The ribs of the respective horns serve as guides which coact with the ends of the journals of the front top rolls to prevent endwise movement of the said top rolls, and thereby fix the position, transversely considered, of the bosses 4 4 of the latter with relation to the bosses 31 31, &c., of the front drawing-roll. In the case of the horns which are located intermediate the extreme ones at the opposite ends of the machine the rib of each horn intervenes between and separates the adjacent journals of two adjacent pairs of front top rolls. The bosses 4 4 of the front top rolls are pressed against the bosses 31 31 of the lower front drawing-roll by means of pressure or tension devices of usual character, such devices being represented in position in the general view, Fig. 1, and also illustrated on a larger scale in Fig. 5, Sheet 3. The said pressure or tension devices comprise for each pair of front top-roll bosses a saddle 6, which engages the upper side of the shaft 41 of such pair of bosses intermediate the latter, a stirrup 7 having the stem thereof passed through a hole in said saddle and its hook-shaped lower end passed through a hole in the fixed so-called "hook" 8, to which further reference will presently be made, and engaged with the latter an expanding spiral spring 9, surrounding the upper portion of the said stem above the saddle, and a thumb-nut 10 screwed upon the threaded upper end of the stirrup, the said spring being compressed between the thumb-nut and the saddle and its tension being adjusted by means of the said thumb-nut to secure the desired pressure of the top-roll bosses 4 4 against the bosses 31 31. Pressure or tension devices in the main similar to those which are used in connection with the front top rolls are used with the rear top drawing-rolls.

Reference will now be made to the roll-stands, the bearings for the shaft 3 of the lower front drawing-roll, the horns, and the hooks, and in connection therewith I will explain the novel construction, arrangement, and combination of such parts by which the aims of the invention are attained.

In the prior construction of drawing mechanisms of the class to which my invention relates, as shown by Figs. 12 and 13, Sheet 7, and Fig. 14, Sheet 8, each bearing-stand 13 for the lower front drawing-roll 3 is located in front of a roll-stand 11 in line with the latter and integral therewith, and a horn 53 rises from the front end of the roll-stand behind the bearing 131, with which such bearing-stand is furnished, and extends forwardly vertically above the said bearing. The location of the horn 53 in the same vertical plane with the bearing 131 makes it necessary that the proximate journals of the two adjacent short shafts 41 41 of the front top rolls should occupy positions in front of and above the said bearing at opposite sides of the middle line of the horn, as shown by Fig. 14. From the resulting arrangement of one top-roll shaft 41 and its pair of bosses 4 4 at one side of the bearing with a set of tension or pressure devices coacting therewith to press the said bosses 4 4 against the corresponding bosses 31 31 of the lower front drawing-roll at such side of the bearing and of another top-roll shaft and its pair of bosses at the other side of said bearing with a different and independent set of tension or pressure devices coöperating therewith to press the latter pair of top-roll bosses against the corresponding bosses 31 31 of the lower front drawing-roll at the latter side of the bearing there is liable to result a variation between the pressures which are transmitted from the two different sets of tension or pressure devices to the lower front drawing-roll at the respective sides of the bearing. This variation results from the independence of the adjusting devices for the two sets of pressure or tension devices and, further, from the difficulty of setting both of the same by hand so as to produce the same tension or pressure at the opposite sides of the bearing.

One general object of my present invention is to balance or equalize at the opposite sides of a bearing for the lower front drawing-roll the strains which are transmitted from the tension or pressure devices of the front top rolls to the shaft of the said lower front drawing-roll. I attain this object by mounting a connected pair of top rolls adjacent the said bearing, with one boss of such pair located at the one hand of the said bearing and the other boss at the other hand thereof and with the shaft 41 of such pair extended across above the bearing and by disposing the tension or pressure devices, which are combined with such shaft in position to act vertically, in line with the bearing. I have represented a pair of top rolls and the tension or pressure devices therefor thus arranged in Fig. 1 of Sheet 1 and Fig. 5 of Sheet 3, also in Fig. 15, Sheet 1. In order to permit this arrangement, I locate in the same space between bosses 31 31 of the lower front drawing-roll 3 with the said bearing, or, in other words, in the same vertical plane therewith, as shown in Figs. 1, 5, and 15, the hook 8, which coöperates with the said tension or pressure devices. I thereby give to the said hook the position which is occupied by the horn in Figs. 12 to 14. The means and manner of supporting the hook thus located will vary in practice in conformity with the general construction and arrangement of the drawing mechanism in which the foregoing feature of my invention is employed, and there otherwise may be a certain range of variation in construction, &c., according to the preference of builders and users. In Figs. 1, 5, and 15 the hook which is employed at each bearing is mounted upon a cover that is provided in connection with the latter. Hooks thus mounted are shown in the detail views Figs. 3 and 4 of Sheet 2 and Figs. 8 and 9 of Sheet 5. In Figs. 10 and 11 of Sheet 6 the hook is mounted separately upon the roller-beam. One or the other of these two arrangements is employed in constructions of drawing mechanisms in which the bearing for the lower front drawing-roll is offset laterally from the roll-stand to the extent of one or more of the spaces between the bosses of the front drawing-rolls, as described hereinafter. When the bearing is located in line with the roll-stand, as in the usual arrangement, (shown in Figs. 12 to 14,) I may mount the corresponding hook upon the front end of the roll-stand, practically where the horn is mounted in Figs. 12 to 14, substantially as is the case of the construction which is shown in Figs. 6 and 7 of Sheet 4, or the hook may be mounted upon the cover of the bearing, as in Fig. 15, Sheet 1.

My present invention comprises certain specific embodiments of principles of construction which are claimed generically in my applications for United States Letters Patent for improvements in machines for preparing and spinning worsted, filed April 5, 1904, Serial No. 201,734, (Case No. 1,) and Serial No. 201,735, (Case No. 2.) By means of the said principles of construction various drawbacks and disadvantages which are inherent in the drawing mechanisms of machines for drawing and spinning worsted as such mechanisms usually are constructed are obviated. The present case constitutes in part a division of the cases aforesaid and covers portions of the generic invention comprising various specific combinations of which the hook constitutes an element and in which the arrangement and relations of the hook are distinguishing and essential features. Having reference now to the said drawbacks and disadvantages, certain thereof grow out of the fact that in the construction which is represented in Figs. 12 to 14 the roll-stand, bearing-stand or support, and top-roll fixture are all portions of one integral structure. Other of the said drawbacks and disadvantages grow out of the fact that in the said construction it is possible to employ only bearings occupying the smallest possible extent of space rearward of the journal portions of the lower front drawing-roll, there being no convenient opportunity for the employment of covers in connection with the said bearings and the use of roller-bearings not being feasible. In the case of an integral structure such as is shown in Figs. 12 to 14 when one portion alone of the same becomes broken or injured the structure in its entirety has to be removed from the drawing mechanism and replaced by a fresh one. This is serious, not only on account of the cost of the new combination structure, but because in order to enable a roll-stand to be removed from a drawing mechanism and a new one inserted in its place in such mechanism a great deal of labor and time is required to be expended, and the extensive dismantling of the drawing mechanism which is necessitated entails considerable loss of use of the machine.

One important aim of my generic invention is to provide a construction which shall reduce the loss in case of breakage or injury, enable the broken or injured part to be replaced by a perfect one with a minimum of labor and expense, and minimize the interruption of the working of the mechanism. This aim is attained in conformity with the principles of my generic invention aforesaid by forming the roll-stand and bearing-stand separately and separately mounting them upon the support or supports therefor in the machine and by constructing as a separate piece the top-roll fixture which is employed in connection with the bearing and detachably securing it in place upon the support therefor. In the specific embodiment of the said generic invention which is covered by certain of the claims of the present case the hook which is located at the bearing, as aforesaid, is thus separately constructed and detachably applied. The accompanying drawings show roll-stands 11 and bearing-stands 132 which are formed separate from each other and separately are mounted upon and secured to the roller-beam 2. Thus in Fig. 5 of Sheet 3 and Figs. 6 and 7 of Sheet 4 a roll-stand is shown which is thus mounted and is attached to the roller-beam 2 by means of a screw 117. Figs. 3 and 4 of Sheet 2, Fig. 5 of Sheet 3, Figs. 8 and 9 of Sheet 5, and Fig. 10 of Sheet 6 show bearing-stands which are mounted, as aforesaid, upon the roller-beam and respectively attached thereto by screws 131. Figs. 6 and 7, Sheet 4, of the drawings, show a separately-formed hook which is mounted upon the front end of a roll-stand and detachably secured thereto by means of a screw 87, the stem of which passes through a hole 88 in the base portion 84 of the hook and enters a threaded hole that is tapped in the roll-stand. Figs. 8 and 9, Sheet 5, show a construction in which the bearing-stand is provided with a cover, the said cover being formed with a hook 8 and being detachably secured to the bearing-stand by means of screws 139 139, the stems of the latter passing through holes in lugs 138 138, which are formed upon the front and rear portions of the cover, and entering threaded holes which are tapped in the bearing-stand at the front and rear of the bearing. Figs. 3 and 4, Sheet 2, show a construction in which a horn 8 is mounted upon the cover 137 of a bearing-stand and in which the horn is formed as a separate piece, which is removably fitted to the top of the cover and secured to the latter by means of a screw 87, the stem of the said screw passing through a hole in the body of the hook and entering a threaded hole which is tapped in the top of the cover. Figs. 10 and 11, Sheet 5, show a construction in which the hook 8, which is employed in connection with the bearing, is separately mounted upon the roller-beam at the rear of the bearing-stand 132 and is secured to the roller-beam by a bolt or screw 87, passing through a hole 88 in the foot of the hook. As will be clear, in the event of injury or wear occurring in the case of any one of the constructions which have just been described, necessitating the removal of a given part and the substitution of a fresh one in lieu thereof, the removal and substitution may be effected with a minimum of cost and trouble. In the case of the hooks which are shown in Figs. 3 and 4, Figs. 6 and 7, and Figs. 10 and 11 a worn or injured hook may readily be detached from the cover, roll-stand, or roller-beam upon which it is mounted and another one applied in its place without it being necessary to replace either the roll-stand or the bearing-stand in connection with which such hook is employed. In the case of the construction which is shown in Figs. 8 and 9 the substitution of a combined cover and hook will simply be necessary. The construction of Figs. 3 and 4 is designed to enable a new hook to be substituted for a worn or injured one without discarding the old cover. If the removal of a bearing-stand is necessary, this may be effected without removing an adjacent roll-stand. A roll-stand may be removed and replaced without disturbance of the lower front drawing-roll and its bearing.

By forming the hook as a separate part I am enabled to make provision for adjusting the same in the direction from front to rear in the machine in order that by such adjustment the portion of the said hook which is engaged by the stirrup of the tension or pressure devices may be caused to assume proper relationship with the guide-surfaces of the laterally-projecting wings of the adjacent horn. By means of this adjustment the hook may be set in the correct position to cause the strain which is applied by means of the said tension or pressure devices to the shaft 41 of a pair of top-roll bosses to act in the proper line with reference to the said guiding-surfaces of the wings of the horns. By properly setting the hook the tension or pressure devices may be caused to act so that the journals of the said shaft 41 shall contact properly with the wings of the horns and shall neither bear too forcibly against the said wings nor tend to separate therefrom in a rearward direction. Provisions for adjustment of the hook are shown in Figs. 3 and 4 of Sheet 2, in Figs. 6 and 7 of Sheet 4, and in Figs. 10 and 11 of Sheet 6. In Figs. 3 and 4 the base of the hook and the upper portion of the cover 137 are fitted together with tongues and grooves to prevent the hook from becoming misplaced in a transverse direction. The hole 88 in the base of the hook through which is passed the stem of the clamping-screw 87 is elongated in the direction from front to rear, forming a longitudinal slot which permits the desired adjustment of the position of the hook to be effected in the direction which is noted above. In Figs. 6 and 7, Sheet 4, the hole 88 in the base of the hook is similarly formed as a longitudinal slot to enable the base to be shifted upon the shoulder or surface 113 of the roll-stand in effecting the desired adjustment. In this construction the base of the hook occupies the slot 119, which is formed in the roll-stand between the opposite side portions 112 112 of the latter. In Figs. 10 and 11, Sheet 6, the hole 88 through the roller-beam 2 is elongated in the direction from front to rear to permit the hook to be adjusted in such direction upon the roller-beam.

A drawback that is incident to the usual construction that is shown in Figs. 12, 13, and 14 arises out of the fact that in case in alining the bearings for the lower front drawing-roll a particular bearing should require adjustment upward or downward relative to its supporting roll-stand to compensate for some variation in the height of the portion of the machine in which such bearing is located such adjustment of the bearing relative to the roll-stand must be accompanied by a shift or adjustment of the said roll-stand horizontally in the direction from front to rear in the machine. This horizontal adjustment is made necessary by the fact that the front and rear walls 116 116 of the pocket or recess in the roll-stand within which the bearing is contained are inclined upward and forward, the direction of such inclination being at right angles to that of the forwardly-inclined slideway or guideway of the roll-stand. Any raising or lowering of the bearing between such inclined walls will produce a displacement of the bearing in the direction from front to rear unless an adjustment or shift of the roll-stand horizontally rearward or forward to the proper extent to offset the said displacement occurs. This compensating adjustment or shift of the roll-stand, however, has the effect of causing the roll-stand to occupy a position more or less out of alinement with respect to the remaining roll-stands, so that the distances between the lower ends of the slideways or guideways of the different roll-stands and the axis of the lower front drawing-roll will not be the same at the respective roll-stands. The difference in this respect results in more or less lack of uniformity in the spacing of the rolls at the respective roll-stands, as will be understood from reference to the roll-stand in Fig. 5 of Sheet 3, Fig. 7 of Sheet 4, Fig. 13 of Sheet 7, and Fig. 14 of Sheet 8. As shown in the said figures, the upper surface of the slideway or guideway of each roll-stand is marked or graduated by transverse lines 118 118, which are uniformly spaced apart in practice at a distance of one inch. The said lines are intended to facilitate the work of setting the stands for the rear drawing-rolls and the carrier-rolls in corresponding positions at the various roll-stands; but, as will be obvious, the departure of a given roll-stand from alinement with the others will result at such roll-stand in variation in the distance between each of such lines and the axis of the lower front drawing-roll and in a corresponding variation in the spacing of the rear drawing-rolls and carrier-rolls with respect to the front drawing-rolls. The construction which I have shown and described herein, in which the roll-stand and bearing-stand are formed as separate parts and separately secured to the roller-beam or other support or supports therefor, obviates the drawbacks aforesaid by enabling the bearings of the lower front drawing-roll to be adjusted as may be required in alining the same with one another without disturbing or affecting the alinement of the roll-stands. This mode of construction and of mounting enables the respective parts to be set and adjusted, respectively, as circumstances may necessitate, each independently of the other. To permit of the adjustments in question, the holes in the roller-beam through which the screws 117 and 131 pass are formed as slots that are elongated in the direction from front to rear in the machine.

The limitations and restrictions in connection with the bearings of the usual construction, which is shown in Figs. 12 and 13, Sheet 7, and Fig. 14, Sheet 8, mainly grow out of the fact that in such construction the roll-stand, top-roll fixture thereon, which is a horn in the case of the figures mentioned, bearing support or extension, and bearing are all located in line with one another and also in line with a given space between bosses 31 31 of the lower front drawing-roll in the direction from front to rear in the machine. In practice the front carrier-roll 122 and presser-roll 129 coöperating therewith often are required to occupy a position as close to the bite of the front drawing-rolls as is possible without actual contact of the peripheries of the said rolls with the peripheries of the bosses 4 4 31 31 of the front drawing-rolls. In order to permit of the close approach of the front carrier-stand to the axis of the shaft of the lower front drawing-roll, which is called for in order to secure the desired relations of the rolls, it is necessary, in consequence of the foregoing arrangement of the parts, that the lower portion or post of the top-roll fixture, together with the portion of the bearing which is located rearward of the journal portion of the shaft 3 of the lower front drawing-roll, should occupy a very small space, measuring in the direction from front to rear in the machine. For this reason it heretofore has been found necessary to employ for the support of the lower front drawing-roll bearings occupying the smallest possible extent of space rearward of the journal portions of the said drawing-roll, and in all cases known to me plain or simple bearings invariably have been employed in practice heretofore in the said connections. Furthermore, for want of room for the convenient application of a cover in front of the base of the top-roll fixture, the bearing heretofore has been left unprovided with a cover and open-topped, so far as I have observed in practice. In the operation of such previous construction the portion of the shaft of the lower front drawing-roll which works in the said bearing becomes covered with lubricant, and dust and flyings collect upon such portion in consequence of the absence of a cover. As a result the lubricant of the bearing becomes charged with impurities, which clog the bearing and cause cutting of the shaft and the bearing, as well as occasion other injuries. In particular, the cutting of the shaft and bearing by particles of wool which work in between them is an extensive and serious cause of trouble and progresses rapidly.

With the foregoing in view another important aim of my generic invention is to obviate the limitations and restrictions which heretofore have existed with respect to the bearing, to enable a bearing of any approved proportions and character to be employed, and more especially to render possible and practicable the use of a roller-bearing and to facilitate the use of a cover in connection with the bearing. Under my generic invention in carrying into effect this latter aim I offset laterally with respect to each roll-stand the corresponding bearing for the lower front drawing-roll to the extent of one or more of the spaces between the bosses of the front drawing-rolls, as presented in my application aforesaid, Serial No. 201,735, (Case No. 2,) and broadly claimed therein, and as illustrated in the present case in Fig. 1, Sheet 1, of the drawings, and Fig. 5, Sheet 3. The support for the said bearing when the latter is thus offset may vary as regards the form and construction thereof and also as regards its connection with the fixed parts of the machine without necessarily involving a departure from the spirit of this portion of the invention in the broader phase of the latter. Herein such support is constituted by the independent bearing-stand 132, which I already have described. In the offset position of the bearing and bearing-stand ample space exists at the rear thereof, which is free to be utilized for constructional purposes. Consequently I am enabled to employ a larger and better bearing than it heretofore has been possible to find room for in connection with the lower front drawing-roll. The employment of a roller-bearing is rendered feasible. Heretofore a serious obstacle to the employment of a roller-bearing in the said connection has been the fact that roller-bearings necessarily occupy considerable space in a radial direction, and one thereof applied to the shaft of the lower front drawing-roll would occupy at the rear of such shaft more radial space than is available in the construction shown in Figs. 12 to 14. Were it attempted to employ a roller-bearing in such construction, the extent of the projection of such bearing rearward behind the said shaft would compel the usual horn to be set so far to the rear that such horn would constitute an obstruction, rendering it impossible to adjust the front carrier-stand forward far enough to place the front carrier-rolls as close to the bite of the front drawing-rolls as sometimes is required. In the drawings I have represented bearing-stands 132, which are suitable for having applied thereto roller-bearings, and in Figs. 8 and 9, Sheet 5, the parts are represented in section in order to show certain of the features of a roller-bearing which in some cases I propose to employ. However, the precise character and construction of the bearing are not in themselves of the gist of the invention. In Figs. 8 and 9 a series of rollers is indicated at 133 133. This series extends around the journal portion of the shaft 3 of the lower front drawing-roll. The said rollers work in a half-box 134, which occupies a seat or recess in the bearing-stand 132. The rollers 133 133 are bored centrally and are fitted upon pins 135 135, which latter at their opposite ends are connected with rings 136, encircling the said journal portion of the shaft of the lower front drawing-roll. One of the said rings is shown in Fig. 9. The opposite rings 136 and the pins 135, extending from one ring to the other, constitute a cage for the rollers 133 133, by means of which the said rollers are kept parallel with the axis of the shaft of the lower front drawing-roll and also are properly spaced apart.

The increased amount of space at the rear of the shaft of the lower front drawing-roll, which the offsetting of the bearing-stand with relation to the roll-stand renders available for the reception of the rearwardly-projecting portion of the bearing, also renders practicable and convenient the application and fitting of a cover to the bearing. I have shown a cover applied in Figs. 1 to 5 and also in Figs. 8 to 10. The cover 127 is formed with extensions 138 138 at the front and rear thereof, through holes in which extension-screws 139 139 are passed into threaded holes, which are tapped in the upper portion of the bearing-stand 122, the said screws serving to secure the cover in place. In Figs. 3, 4, &c., 34 34 are thin casing-plates, which are secured to the opposite ends of the bearing-stand and cover by means of screws 35 35, and which at their inner edges fit closely around the shaft 3 of the front drawing-roll to exclude flyings and dust from the interior of the bearing.

Intermediate the roll-stands in the spaces between roll-bosses which are not occupied by bearings separate and independent hooks and horns are located, as usual, at proper intervals apart upon a proper support or supports, herein the roller-beam. The front end of the roll-stand 11 at the end of the machine, Figs. 1 and 2, is furnished with a horn 5 for coöperation with the outer journal of the shaft 41 of the last pair of top rolls. The front end of each intermediate roll-stand may be provided in like manner with a horn; but preferably the roll-stand is located in the space between the bosses 4 4 of a connected pair of top rolls and furnished with a hook 8, as shown by Fig. 1 of Sheet 1, Fig. 5 of Sheet 3, and Figs. 6 and 7 of Sheet 4.

Every one of the three places of support for the hook to which reference has above been made has advantages of its own, according to the relations which it is desired the hook shall assume and the special results which are sought to be attained. Thus a hook mounted upon the front end of the roll-stand, constituting one feature of the specific invention which is claimed herein and forming a part of the general construction in which the bearing is offset laterally with relation to the roll-stand, (shown in Figs. 1 and 5,) is also adapted to be employed in a construction of the old type in which a bearing is located in line with the roll-stand, as in Figs. 12 and 14, and especially when such bearing is unprovided with a cover. The hook which is mounted directly upon the roller-beam may in some cases be preferred for constructional reasons by builders and users of the machines. The mounting of the hook upon a cover, which constitutes an important feature of the specific invention constituting the subject of the present case, is particularly advantageous for various comparatively important reasons. The cover affords a convenient place of support for the hook and renders unnecessary the separate attachment of the hook directly to the roller-beam or other like support. Hence more space is left upon the roller-beam for the support and adjustment of the bearing thereon without any widening of the roller-beam, and it is unnecessary to bore a hole in the same for the reception of the securing screw or bolt for such hook. Moreover, as shown in Fig. 15, Sheet 1, by providing a cover for the bearing and mounting the hook thereon somewhat forward instead of attaching the hook to the front end of the roll-stand, as in the case of the ordinary construction, it is rendered possible in a construction in which the bearing is arranged directly in front of a roll-stand and in line therewith, as in Fig. 15, to utilize the space which heretofore has been occupied by the base of the horn, and thus employ a bearing of larger dimensions radially at the rear of the shaft of the lower front drawing-roll than it has been practicable or possible to employ heretofore, or to employ a roller-bearing, if desired, as well as to employ the cover itself.

What I claim is—

1. In a drawing mechanism, in combination, a lower front drawing-roll, a bearing for the said lower front drawing-roll, a connected pair of top rolls applied to the lower front drawing-roll with one boss thereof at the one hand of said bearing and the other boss thereof at the other hand of the bearing, and tension or pressure devices in connection with the said pair of top rolls acting vertically in line with the said bearing.

2. In a drawing mechanism, in combination, a lower front drawing-roll, a bearing for the said lower front drawing-roll, a connected pair of top rolls applied to the lower front drawing-roll with one boss thereof at the one hand of said bearing and the other boss thereof at the other hand of the bearing, a hook in the same space between drawing-roll bosses with said bearing, and tension or pressure devices in operative engagement with the said pair of top rolls and also with the said hook.

3. In a drawing mechanism, in combination, a lower front drawing-roll, top rolls applied to the said lower front drawing-roll, a bearing for the said lower front drawing-roll, a cover for the said bearing provided with a hook projecting therefrom, and pressure devices for the top rolls in engagement with said hook.

4. In a drawing mechanism, in combination, a lower front drawing-roll, top rolls applied to the said drawing-roll, a bearing for the said lower front drawing-roll, a cover for the said bearing, a hook removably secured to the said cover, and pressure devices for the top rolls in engagement with the said hook.

5. In a drawing mechanism, in combination, a lower front drawing-roll, top rolls applied to the said lower front drawing-roll, a bearing for the said lower front drawing-roll, a cover for the said bearing, a hook mounted upon the said cover, means to adjust the said hook upon said cover in the direction from front to rear in the machine, and pressure devices for the top rolls in engagement with the said hook.

6. In a drawing mechanism, in combination, a roll-stand, rear drawing-rolls mounted on the said roll-stand, a lower front drawing-roll, top rolls applied to the said lower front drawing-roll, a hook projecting from the said roll-stand, and pressure devices for the said top rolls in engagement with the said hook.

7. In a drawing mechanism, in combination, a roll-stand, rear drawing-rolls mounted on said roll-stand, a lower front drawing-roll, top rolls applied to the said lower front drawing-roll, a hook projecting from the said roll-stand and having provisions for adjustment in the direction from front to rear in the mechanism, and pressure devices for the said top rolls in engagement with the said hook.

8. In a drawing mechanism, in combination, the roller-beam, a lower front drawing-roll, a bearing-stand for the said lower front drawing-roll, a roll-stand, the said bearing-stand and the said roll-stand being independently secured to the roller-beam, top rolls applied to the said lower front drawing-roll, a hook projecting from the roll-stand, and pressure devices for the said top rolls in engagement with the said hook.

9. In a drawing mechanism, in combination, the roller-beam, a lower front drawing-roll, a bearing-stand for the said lower front drawing-roll, a roll-stand, the said bearing-stand and the said roll-stand being independently secured to the roller-beam, top rolls applied to the said lower front drawing-roll, a hook projecting from but separably secured to the roll-stand, and pressure devices for the said top rolls in engagement with the said hook.

10. In a drawing mechanism, in combination, the roller-beam, a lower front drawing-roll, a bearing-stand for the said lower front drawing-roll, a roll-stand, the said bearing-stand and the said roll-stand being independently secured to the roller-beam, top rolls applied to the said lower front drawing-roll, a hook mounted upon the said bearing-stand, and pressure devices for the said top rolls in engagement with the said hook.

11. In a drawing mechanism, in combination, the roller-beam, a lower front drawing-roll, a bearing-stand for the said lower front drawing-roll, a roll-stand, the said bearing-stand and the said roll-stand being independently secured to the roller-beam, top rolls applied to the said lower front drawing-roll, a hook mounted upon the bearing-stand and separably secured to its support, and pressure devices for the said top rolls in engagement with the said hook.

12. In a drawing mechanism, in combination, the roller-beam, a lower front drawing-roll, rear drawing-rolls, adjacent roll-stands supporting the said rear drawing-rolls, a bearing located intermediate said roll-stands and supporting the said lower front drawing-roll, top rolls applied to the said lower front drawing-roll, a hook, and pressure devices for the said top rolls in engagement with the said hook, the said bearing and the said hook being located within such portion of the length of the mechanism as includes two (2) drawing-bosses and the space between them.

13. In a drawing mechanism, in combination, the roller-beam, a lower front drawing-roll, rear drawing-rolls, roll-stands supporting the said rear drawing-rolls, a bearing-stand located intermediate said roll-stands and supporting said lower front drawing-roll, a hook mounted upon the said bearing-stand, a hook mounted upon the adjacent roll-stand, and pressure devices for respective pairs of top rolls in engagement with the respective hooks.

In testimony whereof I affix my signature in the presence of two witnesses.

FREDERICK PIERPONT SHAW.

Witnesses:
ESTHER PERRY TAYLOR,
IRVING DUNNING KIMBALL.